United States Patent
Jarrassier (10) Patent No.: US 10,238,099 B2
(45) Date of Patent: Mar. 26, 2019

(54) SPRAY NOZZLE PROVIDED WITH AN IMPROVED INCORPORATOR

(71) Applicant: KUHN-BLANCHARD SAS, Chemere (FR)

(72) Inventor: Benoit Jarrassier, Chemere (FR)

(73) Assignee: KUHN-BLANCHARD SAS, Chemere (FR)

( * ) Notice: Subject to any disclaimer, the term of this patent is extended or adjusted under 35 U.S.C. 154(b) by 42 days.

(21) Appl. No.: 15/319,888

(22) PCT Filed: Jun. 30, 2015

(86) PCT No.: PCT/FR2015/051790
§ 371 (c)(1),
(2) Date: Dec. 19, 2016

(87) PCT Pub. No.: WO2016/001571
PCT Pub. Date: Jan. 7, 2016

(65) Prior Publication Data
US 2017/0135331 A1  May 18, 2017

(30) Foreign Application Priority Data

Jun. 30, 2014 (FR) ..................................... 14 56191

(51) Int. Cl.
*A01M 7/00* (2006.01)
*A01C 23/00* (2006.01)
*B05B 13/00* (2006.01)

(52) U.S. Cl.
CPC ......... *A01M 7/0092* (2013.01); *A01C 23/008* (2013.01); *A01M 7/0071* (2013.01); *A01M 7/0085* (2013.01); *B05B 13/005* (2013.01)

(58) Field of Classification Search
CPC .............. A01M 7/0082; A01M 7/0085; A01M 7/0092; A01C 23/008
USPC ................................................... 239/146–176
See application file for complete search history.

(56) References Cited

U.S. PATENT DOCUMENTS

| | | | | |
|---|---|---|---|---|
| 3,787,084 A | * | 1/1974 | Garlinghouse | E04G 21/025 294/68.22 |
| 5,004,155 A | * | 4/1991 | Dashevsky | A01M 7/0092 239/127 |
| 5,404,993 A | * | 4/1995 | Scarrow | B65G 33/24 198/311 |
| 5,609,417 A | | 3/1997 | Otte | |

FOREIGN PATENT DOCUMENTS

| | | |
|---|---|---|
| EP | 1 961 299 A1 | 8/2008 |
| EP | 2 084 964 A1 | 8/2009 |

OTHER PUBLICATIONS

International Search Report dated Oct. 12, 2015 in PCT/FR2015/051790 filed Jun. 30, 2015.

* cited by examiner

*Primary Examiner* — Viet Le
(74) *Attorney, Agent, or Firm* — Oblon, McClelland, Maier & Neustadt, L.L.P.

(57) ABSTRACT

A sprayer including a chassis supporting a main container, a spray boom, and an incorporation device, the incorporation device having an active state and an inactive state. A volume occupied by the incorporation device can be varied between its active state and its inactive state. The incorporation device has a larger capacity in its active state and is smaller in size in its inactive state.

12 Claims, 6 Drawing Sheets

SPRAY NOZZLE PROVIDED WITH AN IMPROVED INCORPORATOR

BACKGROUND

This invention concerns the general technical field of agricultural machinery and in particular spreaders. More specifically, it relates to a sprayer including a chassis supporting a main container, a spray boom and an incorporation device, the incorporation device having an active state and an inactive state.

An agricultural sprayer is used to spread on plants, in droplet form, a treatment product. To this end, the sprayer includes various elements that are connected to each other by a water circuit. These elements are a main container containing the spray mixture and spray nozzles designed to distribute the spray mixture on the plants to be treated. Spraying consists of pumping the spray mixture, via the water circuit, from the main container to the nozzles, while at the same time moving the nozzles relative to the plants to be treated. The profitability and yield of a crop is governed by the use of plant protection products.

Before actually spraying, the user must prepare the treatment spray mixture. For obvious storage reasons, the active ingredient of the spray mixture is packaged in concentrated form in a liquid or solid state. Preparing the spray mixture consists of diluting one or several active ingredients, for example plant protection products, in water. To do so and to ensure user safety, the majority of agricultural sprayers include an incorporation device. This can be stationary or mobile relative to the sprayer and should preferably be accessible from the ground. The incorporation device is comprised of a vat into which the user pours the active ingredient. When preparing the spray mixture, the vat is drained, via the water circuit, to the main container.

Some sprayers are fitted with a movable incorporation device that switches from an inactive state to an active state to be used. When preparing the spray mixture, the user brings the incorporation device in its active state to facilitate the pouring of the active ingredient packaged in concentrated form in a liquid or solid state. The incorporation device usually has a parallelogram mechanism that allows it to be retracted by moving it away from the ground or to be brought closer to the ground to make it easier to access. This type of mechanism is expensive and complex. It is known that the incorporation device is used for a very short amount of time compared with the total amount of time the sprayer is used, including filling, spreading and rinsing. When the spray mixture has been prepared, the incorporation device still occupies space on the chassis, even though it is no longer required.

BRIEF SUMMARY

The goal of the present invention is therefore to overcome the various disadvantages of the technology in its current state by proposing a sprayer in which the arrangement of the various parts is optimised.

To this end, an important feature of the invention is that the volume occupied by the incorporation device can be varied between its active state and its inactive state. Advantageously, the volume occupied by the incorporation device can be varied according to its state of use. In its inactive state, the incorporation device occupies a far smaller volume than in its active state. The incorporation device is therefore compact in its inactive state. By reducing the size of the incorporation device in its inactive state, space is freed up on the chassis of the sprayer. This available space improves the usability of the control panel, allows a storage compartment to be added and/or even enables the capacity of the main container to be increased in order to enhance the operating time of the sprayer.

BRIEF DESCRIPTION OF THE DRAWINGS

Other features of the invention will become clear in the other sub-claims and in the following description of two non-restrictive example embodiments of the invention shown in the attached drawings, in which:

DETAILED DESCRIPTION

The agricultural machine according to the invention is a sprayer (1) designed to spread on the soil or distribute on the vegetation plant protection products and/or liquid fertilisers to remove weeds, treat against diseases and destroy insects that damage crops. The sprayer (1) is also used to spread liquid fertilisers to fertilise crops. A sprayer (1) is used for agricultural crops, viticulture, arboriculture and green spaces. In such cases it is referred to as an agricultural sprayer.

Figure 1:
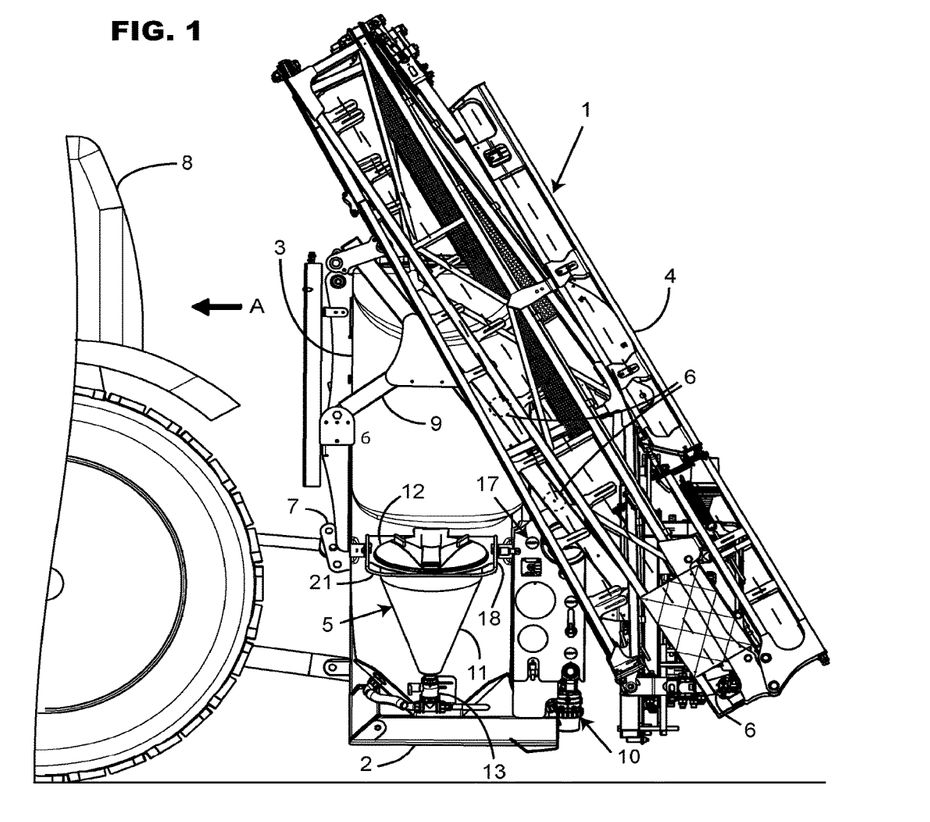
FIG. 1 shows a side view of a sprayer according to the invention, with an incorporation device in its active state.

FIG. 1 shows a sprayer (1) that includes a chassis (2) that supports a main container (3), a spray boom (4) and an incorporation device (5). The incorporation device (5) has an active state and an inactive state. The incorporation device (5) is considered to be in its active state when it is or will be used. The incorporation device (5) is considered to be in its inactive state when it is not used. The main container (3) is designed to contain the treatment spray mixture and the spray boom (4) includes one or several pipeline(s) supporting spray nozzles (6). Some spray nozzles (6) are shown in simplified form in FIGS. 1 and 2. This is a pressurised and air blast sprayer. The spray boom (4) is shown in its folded position on either side of the main container (3). The various sections that form the spray boom (4) are folded for transport in order to occupy less space.

In this example embodiment, the sprayer (1) is mounted. The chassis (2) includes a hitching system (7) so that it can be hitched to the three-point hitching device of a tractor (8). The tractor (8) moves and drives the sprayer (1) in a direction and sense of advance indicated by the arrow (A). In the remainder of the description, the following notions "front", "rear" and "in front of", "behind" are defined relative to the direction of advance (A). It is assumed that the present invention also concerns trailed sprayers and self-propelled sprayers.

During work, the sprayer (1) is moved on a field containing plants to treat. The spray boom (4) is arranged at a right angle relative to the direction of advance (A), either side of a median vertical plane of the sprayer (1). The boom (4) is linked to the chassis (2) by means of a connecting device (9).

The spray height of the nozzles (6) can also be adjusted to different sizes of plants to be treated. For its part, the treatment spray mixture is pumped, by means of a water circuit (10), from the main container (3) to be deposited, via the spray nozzles (6), on the plants.

Figure 3:
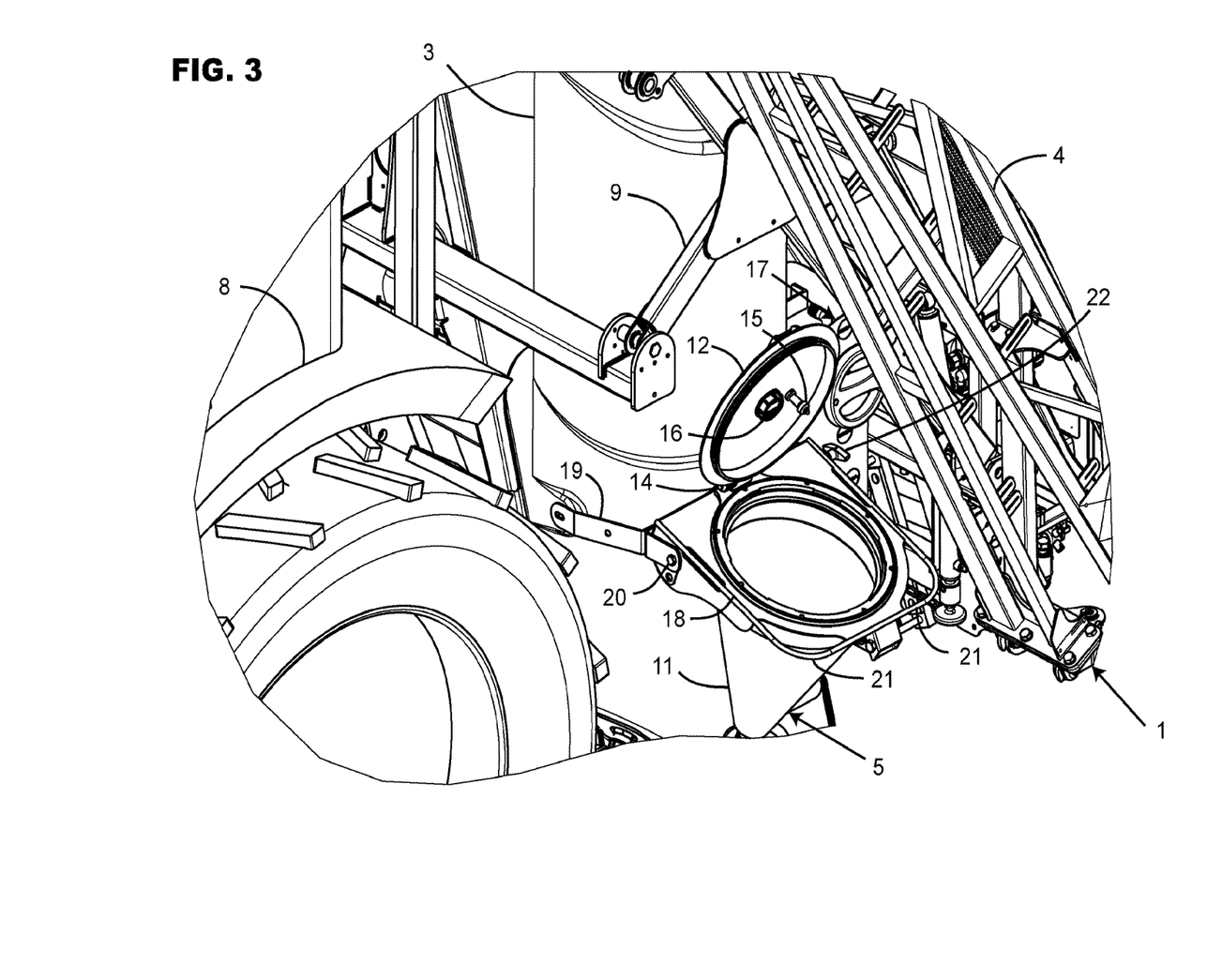
FIG. 3 is a detailed view of the incorporation device in accordance with FIG. 1, ready to use.

The sprayer (1) includes an incorporation device (5) that is designed to gradually incorporate the plant protection products in the main container (3) without the user coming into contact with them. The plant protection products can be in liquid or solid form. The liquid products are usually stored in concentrated form in cans. The function of the incorporation device (5) is to facilitate operation, as it prevents the user from having to pour the plant protection products into the upper opening of the main container (3). The incorporation device (5) is accessible from the ground in its active state, as shown in FIGS. 1 and 3, which makes it easier to pour plant protection products into the incorporation device (5). Preparing the treatment spray mixture consists of diluting one or several plant protection products in water. The incorporation operation is therefore necessary for preparing the treatment spray mixture before actually carrying out spraying. To do so, the user pours the plant protection products into the incorporation device (5), then transfers the contents of the incorporation device (5) to the main container (3) via the water circuit (10).

Figure 2:
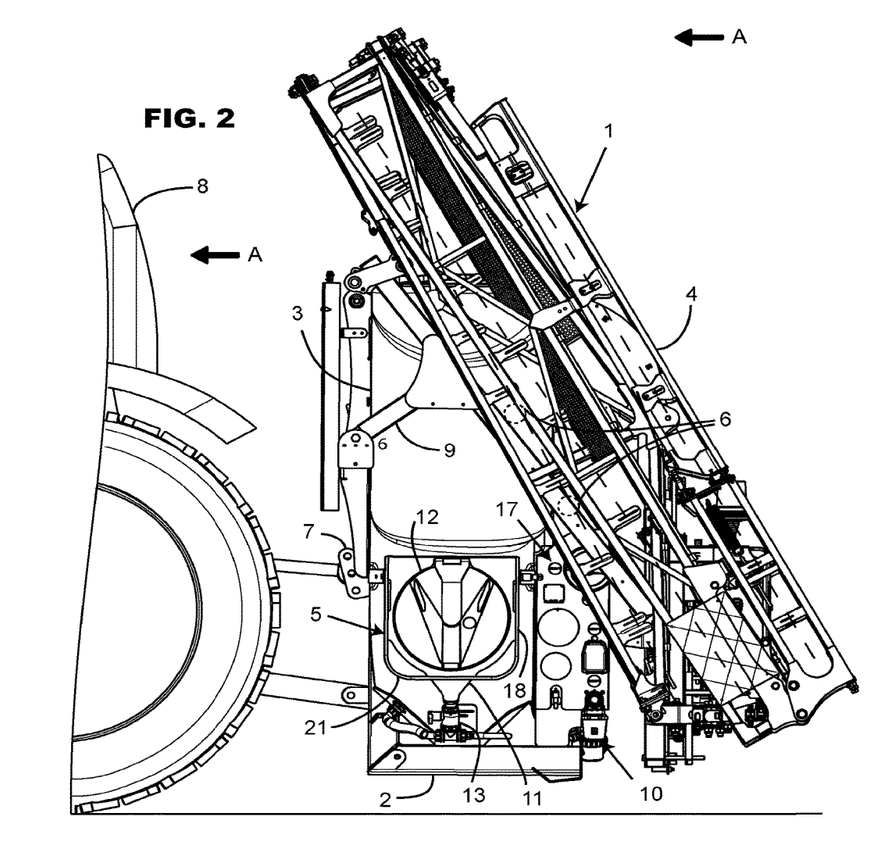
FIG. 2 shows a side view of the sprayer with the incorporation device in its inactive state.
Figure 4:
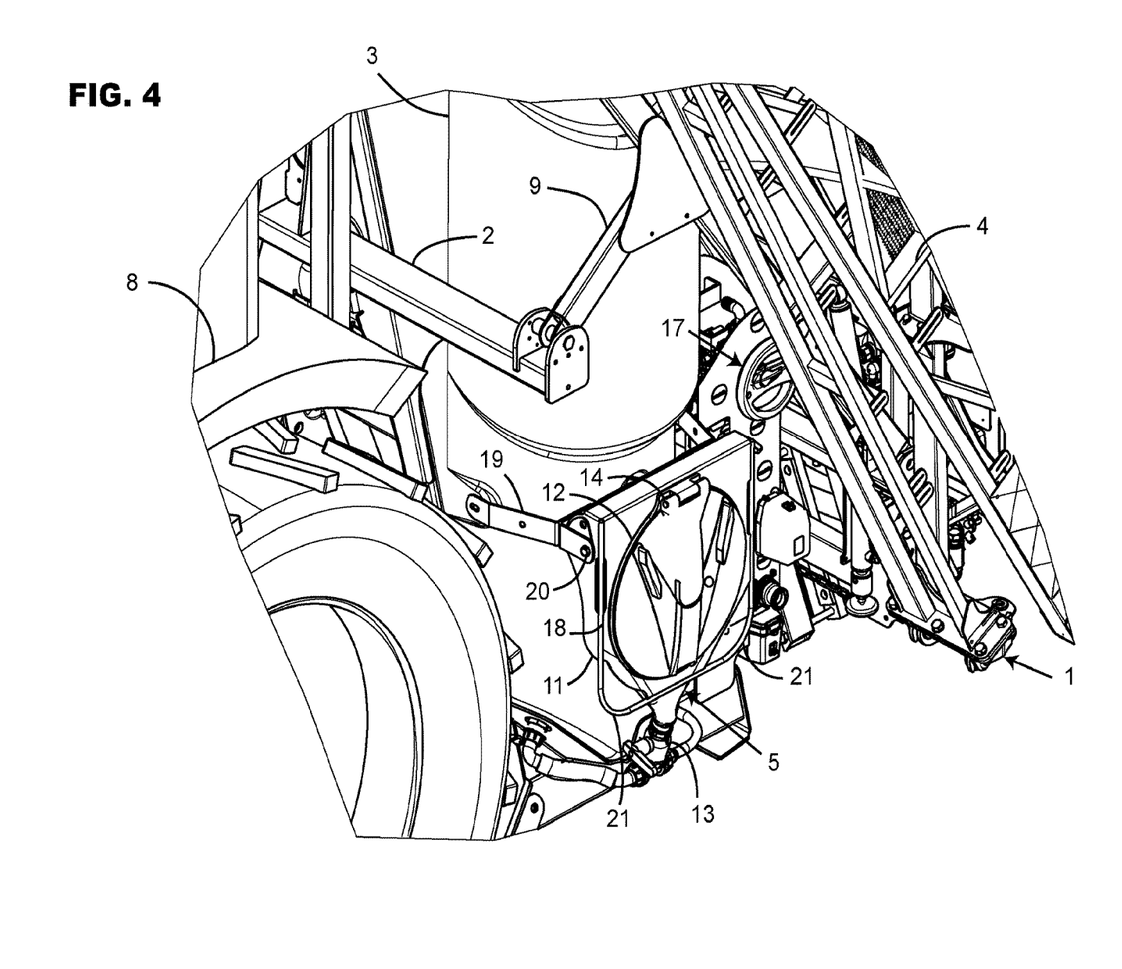
FIG. 4 is a detailed view of the incorporation device in its inactive state.

The treatment spray mixture is usually prepared on the farm in a filling area to limit the risk of accidental pollution, as the product handled is concentrated. The incorporation device (5) is positioned for the incorporation operation as shown in FIG. 1. The incorporation device (5) is placed on the left-hand side of the sprayer (1), according to the direction of advance (A). The incorporation device (5) exceeds the road transport width in its active state (FIG. 3). It is for example offset relative to the spray boom (4) so that the user has a clear working environment to pour the plant protection products. The incorporation device (5) is advantageously mobile relative to the chassis (2) of the sprayer (1), as it is stored when not in use (FIGS. 2 and 4). Alternatively, the incorporation device (5) is placed on the right-hand side or at the rear of the sprayer (1).

The sprayer (1) is used to divide the treatment spray mixture into droplets via the nozzles (6) and distribute it across a maximum surface area with a minimum of liquid. The plant protection products must be measured out with great care and accurately spread very uniformly. Before the spraying stage, it is necessary to fill the main container (3) with clean water and add the plant protection products. These various stages are managed using a control panel (17). Generally speaking, the water circuit (10) performs a variety of functions: the filling function, the incorporation function, the spraying function, the rinsing function and the draining function. To this end, the water circuit (10) notably includes at least one pump, one pipe network and several valves. The valves are placed on the control panel (17), which extends in the vicinity of the incorporation device (5). The control panel (17) and the valves can be easily accessed by the user. The positioning of the valves determines the type of function performed by the water circuit (10). The pump is used to fill the sprayer (1), to mix the treatment spray mixture and to spray. The pump is, for example, driven in rotation by the tractor (8). In the example embodiment of a mounted sprayer, as shown in FIGS. 1 and 2, the pump is housed between the bottom of the main container (3) and the base of the chassis (2).

According to an important feature of the invention, the volume occupied by the incorporation device (5) can be varied between its active state and its inactive state. Due to the variable volume of the incorporation device (5) depending on its state of use, additional space is created on the sprayer (1). According to another important feature, the volume occupied by the incorporation device (5) in its inactive state is reduced compared with the volume occupied in its active state. The incorporation device (5) is therefore rather compact in its inactive state, when it is not used. By reducing the size of the incorporation device (5) in its inactive state, space is freed up on the sprayer (1). This available space improves the usability of the control panel, allows a storage compartment to be added and/or even enables the capacity of the main container (3) to be increased in order to enhance the operating time of the sprayer (1). The operating time of a sprayer (1) is closely connected to the loaded volume of treatment spray mixture. The capacity of the main container (3) can therefore be increased, as the size of the incorporation device (5) is reduced when it is not used. The capacity of the main container (3) is increased within the limits of the road transport width. The incorporation device (5) according to the invention is loaded onto the sprayer (1) and always remains attached to the sprayer (1) even when it is not used. The incorporation device (5) therefore has a significant capacity in its active state and is smaller in size in its inactive state.

The sprayer (1) shown in FIG. 2 is identical to the sprayer in FIG. 1 with the exception of the depiction of the incorporation device (5). The incorporation device (5) is shown in its inactive state, when it is not used. This state is shown in more detail in FIG. 4. Note that the incorporation device (5) is very compact. It does not extend beyond the road transport width, which is important for this type of sprayer (1) as it is necessary to travel via roads and paths to access different fields. In these figures, the volume of the incorporation device (5) has a reduced width. The incorporation device (5) is vertically stored against the main container (3).

Advantageously, the incorporation device (5) includes a body (11), a cover (12) and a suction device (13). The body (11) is advantageously deformable. It is made from a flexible material that is chemical-resistant. The body (11) is comprised of a single part of a substantially constant thickness. The body (11) has a funnel shape in its active state. The body (11) can be created by moulding, assembly or another procedure. By using moulding, the thickness of the body (11) is relatively low while also being constant. The body (11) can for example be made from a thermoplastic elastomer material. The funnel shape can also be achieved by assembly. Bonding is an assembly procedure that can be used to create a funnel or cone from a portion of disk. The two sides of the portion of disk overlap each other to enable bonding. An alternative to bonding is ultrasonic welding when the body (11) is a thermoplastic material. The funnel is positioned with the filling opening facing upwards. The filling opening is larger than the nearby opening of the suction device (13). Its conical shape achieves perfect incorporation of the products. The function of the cover (12) is to cover the filling opening. The filling opening is advantageously circular. The upper part of the body (11) is covered by a cover (12) and includes a suction device (13) in its lower part. The suction device (13) is for example a Venturi system. The plant protection products poured into the incorporation device (5) fall by gravity. The plant protection products are propelled into the main container (3) by depression via the Venturi system. The cover (12) is sealed to prevent foreign bodies entering the body (11) of the incorporation device (5). This cover (12) is shown in its open position in FIG. 3. It allows the user to pour the products into the incorporation device (5). The cover (12) is articulated to the body (11) and swivels around a substantially horizontal axis (14). The axis (14) is oriented parallel to the direction of advance (A) as shown in FIGS. 1 to 5. The cover (12) is therefore lifted upwards to be able to access the filling opening. Note that the cover opening (12) is limited by the main container (3) in FIG. 3. The cover (12) also serves to protect the user when rinsing the incorporation device (5). To this end, the incorporation device (5) is equipped with a rinsing system (15). The rinsing system (15) is used to rinse the interior of the incorporation device (5). In the example embodiment shown in FIG. 3, the rinsing system (15) is a gyro-washer positioned in the cover (12). The incorporation device (5) can also be fitted with a can-rinser (FIG. 6) to rinse the plant protection product packaging. The rinsing system (15) and the can-rinser are supplied with clean water by a rinsing container or an external source. The rinsing water is incorporated into the main container (3). In an alternative not shown, the axis (14) is substantially vertical. As such, the cover (12) is opened by rotating to the right or left. The cover (12) is then laterally offset relative to the filling opening.

Particularly advantageously, the incorporation device (5) is fitted with an air-exhaust device (16) that allows air to escape when the incorporation device (5) switches from its active state to its inactive state. As such, the air contained in the body (11) of the incorporation device (5) can escape as the incorporation device (5) is reduced in size. The air-exhaust device (16) is positioned in the cover (12). The cover (12) is sufficiently rigid to be able to support the rinsing device (15) and the air-exhaust device (16).

According to the example embodiment shown in FIGS. 1 to 5, the incorporation device (5) includes a framework (18) articulated to the chassis (2). The framework (18) supports the body (11) of the incorporation device (5). The cover (12) covering the body (11) is attached to the framework (18). The framework (18) is linked to the chassis (2) by means of arms (19). The framework (18) is linked to the arms (19) by means of an articulation (20) with an axis substantially horizontal and parallel to the direction of advance (A). When the incorporation device (5) is placed in its active state, as shown in FIGS. 1 and 3, the framework (18) is substantially horizontal so that the filling opening can be accessed to pour the plant protection products. The cover (12) extends in a substantially horizontal plane. Note that the framework (18) is slightly tilted towards the ground on the side opposite to the side attached to the articulation (20). To change the incorporation device (5) from its active state to its inactive state, and vice versa, it includes at least one grip (21). The framework (18) advantageously has two grips (21) positioned on each side of the filling opening. FIGS. 2 and 4 show the incorporation device (5) in its inactive state. The framework (18) has swivelled around the articulation (20) to a substantially vertical position. The articulation (20) is advantageously parallel to the axis (14) of the cover (12). The conical body (11) has been flattened to reduce the volume of the incorporation device (5). The volume is reduced in the width of the incorporation device (5), i.e. in the direction running at a right angle to the direction of advance (A). The swivelling of the framework (18) towards the ground flattens the body (11) and the cover (12) extends in a substantially vertical plane. In this position in which the incorporation device (5) is not used, the grip (21) is positioned in the vicinity of the suction device (13).

Figure 6:
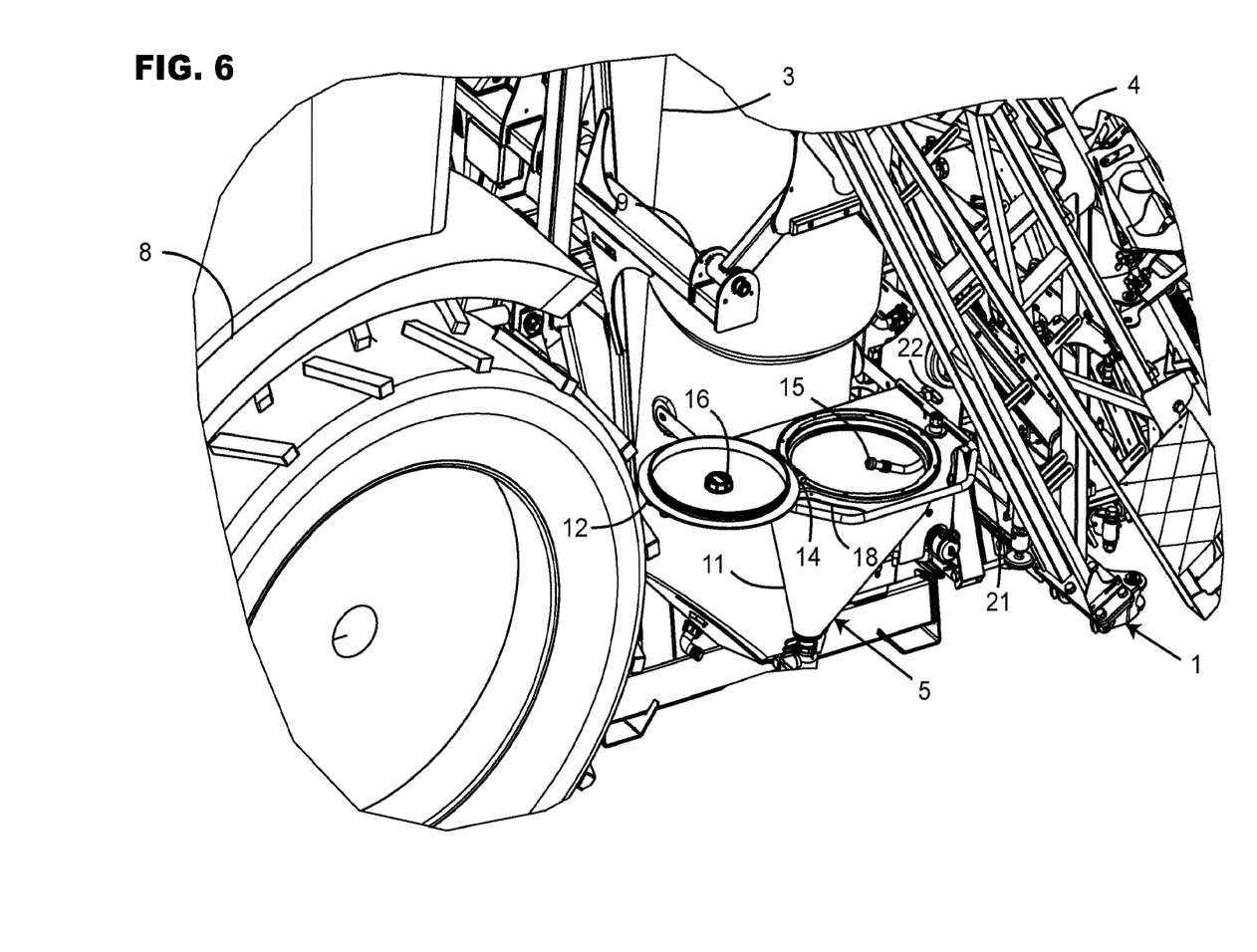
FIG. 6 is an incorporation device in accordance with another example embodiment in its active state.

FIG. 6 shows an incorporation device according to another example embodiment. The axis (14) of the cover (12) is substantially horizontal and is directed perpendicular to the direction of advance (A). The cover is opened (12) by rotating upwards and to the side relative to the filling opening. Due to the sideways movement of the cover (12), the cover (12) can be opened more substantially, as the cover (12) does not collide with the main container (3). Notice that the rinsing system (15) is positioned on the framework (18) rather than on the cover (12). The rinsing system (15) is also used to rinse the cans. The rinsing system (15) is supplied via the connector available on the upper part of the framework (18).

Preferably, the incorporation device (5) includes an indexing system (22). This indexing system (22) serves to maintain the incorporation device (5) in its active state or its inactive state. It is comprised of a grip fitted with a spring.

Figure 5:
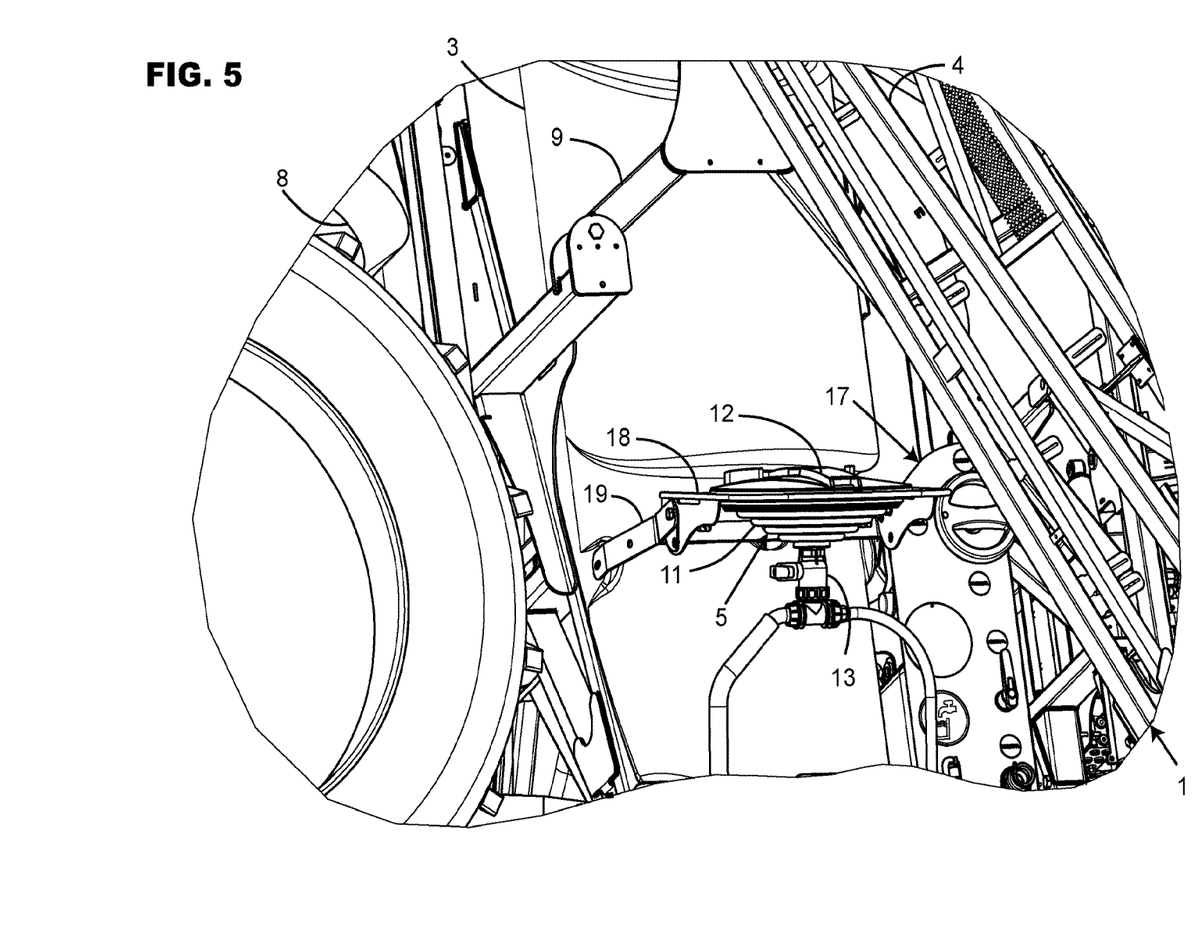
FIG. 5 is a detailed view of an incorporation device in accordance with another example embodiment in an inactive state.

According to the other example embodiment shown in FIG. 5, the volume of the incorporation device (5) has a reduced height. The cover (12) and the framework (18) are in the same position as the active state shown in FIG. 1, i.e. they remain in a substantially horizontal plane. To change from the active state to the inactive state, the body (11) folds on itself so that the suction device (13) is located nearby the cover (12). In this example embodiment, the framework (18) is attached to the arm (19) by a translating system rather than by an articulation (20) with a horizontal axis. To allow the incorporation device (5) to fold in this way, the pipes connected to the suction device (13) must be sufficiently long to enable it to be placed in a non-use position. Folding the incorporation device (5) in this way has an application on a trailed or self-propelled sprayer. The incorporation device (5) can then be placed underneath the chassis or underneath the container. It can also be used for a mounted sprayer.

It is clear that the invention is not limited to the example embodiment described above and shown in the attached drawings. Modifications are possible, particularly concerning the composition or number of the various elements or by substituting technical equivalents, without departing from the scope of protection as defined by the following claims.

The invention claimed is:

1. A sprayer comprising:
   a chassis carrying a main container;
   a spray boom; and
   an incorporation device including a deformable body and a cover on the body, the incorporation device being configured to vary between an active state and an inactive state,
   wherein the incorporation device occupies a first volume in the active state in which the body is conical, and
   wherein, to vary the incorporation device from the active state to the inactive state, the incorporation device is articulated around an articulation axis to rotate the cover and flatten the body such that the incorporation device occupies a second volume in the inactive state, the first volume being larger than the second volume.

2. The sprayer according to claim 1, wherein the incorporation device has a reduced width in the inactive state compared with the active state.

3. The sprayer according to claim 1, wherein the incorporation device has a reduced height in the inactive state compared with the active state.

4. The sprayer according to claim 1, wherein the incorporation device includes an air-exhaust device.

5. The sprayer according to claim 1, wherein the incorporation device includes a suction device and the body is made from a flexible and deformable material.

6. The sprayer according to claim 5, wherein the body is comprised of a single part of a substantially constant thickness.

7. The sprayer according to claim 1, wherein the incorporation device includes a framework articulated to the chassis, the framework supporting the body.

8. The sprayer according to claim 7, wherein the framework is articulated to the chassis by an articulation with the articulation axis, the articulation axis being substantially horizontal and parallel to a direction of advance of the sprayer.

9. The sprayer according to claim 1, wherein the incorporation device includes at least one grip.

10. The sprayer according to claim 1, wherein the cover is rotatable with respect to the body around a rotation axis, and the rotation axis of the cover is parallel to the articulation axis of the incorporation device.

11. The sprayer according to claim 1, wherein the cover is rotatable with respect to the body around a rotation axis, and the rotation axis of the cover is perpendicular to the articulation axis of the incorporation device.

12. The sprayer according to claim 1, wherein the cover is substantially horizontal in the active state and substantially vertical in the inactive state.

* * * * *